R. SHEPARD.
Clod-Crusher.
No. 34,851.
Patented Apr. 1, 1862.
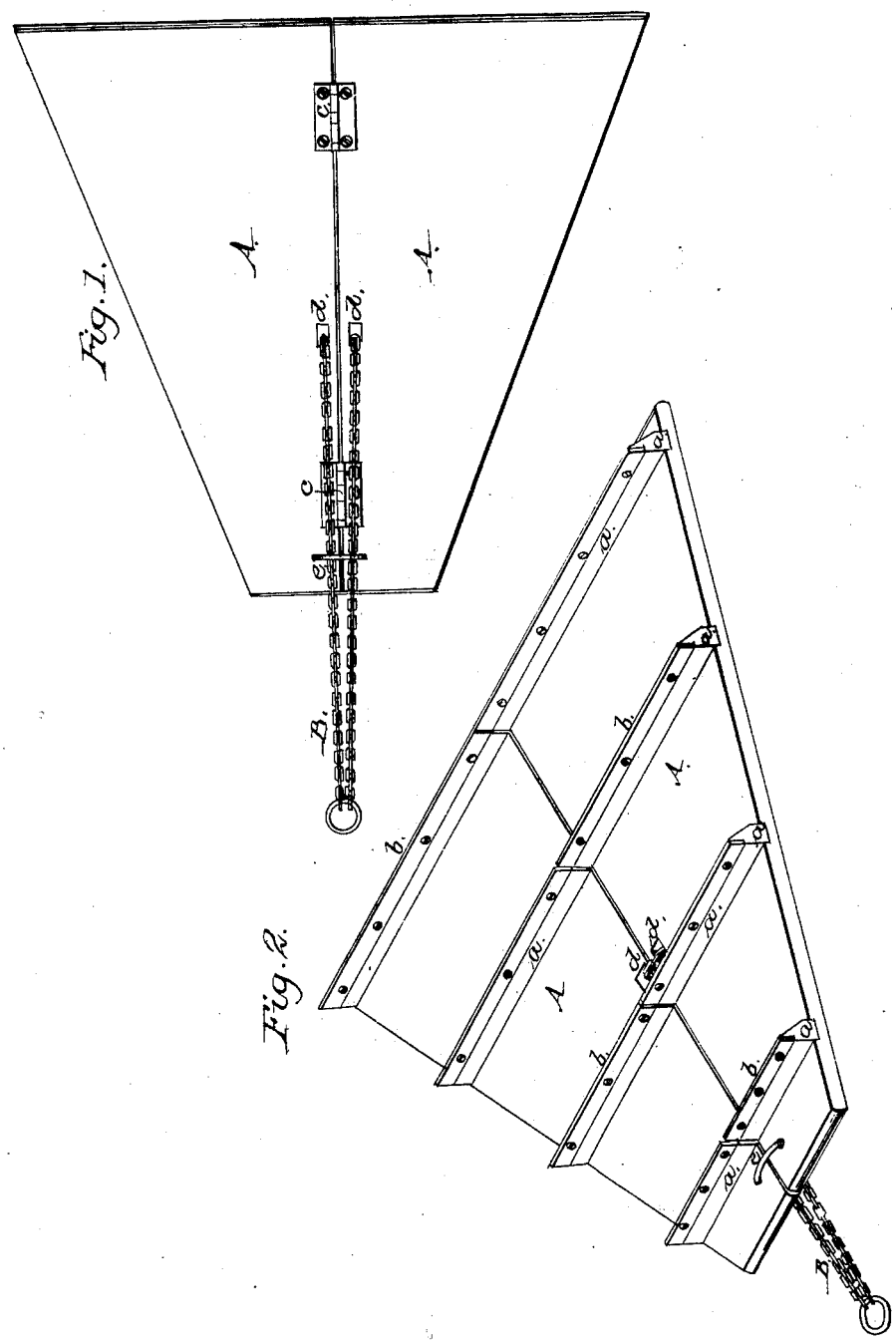

UNITED STATES PATENT OFFICE.

ROBERT SHEPARD, OF SHAKER VILLAGE, NEW HAMPSHIRE.

IMPROVED LAND-LEVELER.

Specification forming part of Letters Patent No. 34,851, dated April 1, 1862.

*To all whom it may concern:*

Be it known that I, ROBERT SHEPARD, of Shaker Village, in the county of Merrimack and State of New Hampshire, have invented certain new and useful improvements in a land-leveler for smoothing down and leveling plowed land for agricultural purposes; and I do hereby declare that the following is a full, clear, and exact description of the construction and operation of the same, reference being had to the accompanying drawings, making a part of this specification, in which—

Figure 1 represents a top plan of the machine. Fig. 2 represents a perspective view of the under side of the machine or implement to show its construction.

I aware that road-scrapers have been used with a vertical, or nearly so, scraping-board, which, however, are inclined or oblique to the line in which they are to be drawn.

My invention differs materially from the above-named machines in construction, operation, and object. The purpose of my machine is to level down plowed ground by simply drawing it over the ground like a harrow is drawn. It scrapes off the crowns of the furrows and deposits the excess in the depressions between them, thus leaving the surface of the field like that of a well-tilled garden; and my invention consists in combining with an angular-shaped platform a series of transverse ribs that will scrape off from the higher points and deposit in the lower places the soil or earth over which it is drawn, thus making the surface comparatively smooth and level and ready to receive the seeds of grains to be planted therein.

To enable others skilled in the art to make and use my invention, I will proceed to describe the same with reference to the drawings.

A represents an angular platform, made of plank or any other suitable material. The object of a platform instead of a frame is that the soil shall not rise up and clog or run over, as it would do if an open frame-work were used.

On the under side of this platform are bolted, spiked, or otherwise fastened a series of ribs or flanges, *a a a*, &c., which, if made of wood, may be shod with iron, *b*, or may be of wood or of iron alone, in which latter case the iron of commerce known as "angle-iron" would answer an excellent purpose. These ribs, as herein shown, are leveled off on their rear sides, so as to make the scraping-edges sharp enough to penetrate the soil slightly.

For convenience of transportation, or for stowing away in the building when not in use, I make a joint through the center of the platform and ribs from front to rear, uniting the two sections by hinges *c*. The ribs I have represented as being at right angles to the line of draft. They may be inclined in the same or in opposite directions, though I prefer them as shown.

B is the drag-chain. It may be passed through openings *d* in the platform, as shown, and united to a ring or clevis to draw by, and the front of the implement may be connected to the draft-chain by a chain or rope, *e*, or any other known device, so as to relieve the front of the leveler and not allow it to run too much into the ground.

By simply drawing this implement over the plowed ground it scrapes off the high points and deposits the excess in the hollows or depressions, and thus leaves the soil not only pulverized or worked to a certain degree, but also leaves the surface of the field comparatively level and smooth.

Having thus fully described my invention, what I claim therein as new, and desire to secure by Letters Patent, is—

A land-leveler for agricultural purposes, composed of a platform and series of ribs, made and operating in the manner and for the purpose herein set forth.

ROBERT SHEPARD.

Witnesses:
J. S. CILLEY,
JAMES MOORE.